UNITED STATES PATENT OFFICE.

LEVI ISAAC BODENHAMER, OF KERNERSVILLE, NORTH CAROLINA.

COMPOUND FOR PRESERVING EGGS.

SPECIFICATION forming part of Letters Patent No. 326,895, dated September 22, 1885.

Application filed July 31, 1885. (No specimens.)

*To all whom it may concern:*

Be it known that I, LEVI ISAAC BODENHAMER, a citizen of the United States, residing at Kernersville, in the county of Forsyth and State of North Carolina, have invented certain new and useful Improvements in Compounds for Preserving Eggs; and I do hereby declare the following to be a full, clear, and exact description of the invention, such as will enable others skilled in the art to which it appertains to make and use the same.

My invention relates to the preservation of eggs; and my said invention consists of a new compound or solution, composed of water, lime, salt, saltpeter, decoction of oak-bark, and powdered charcoal, into which the eggs are to be placed and kept until desired for use.

This invention has for its object the formation of a compound for preserving eggs, that will not decompose or be otherwise affected, but will remain the same and preserve the eggs for an indefinite period.

In carrying out my proposed invention I proceed as follows: Into one gallon of water I place three ounces of fresh lime, one-half pint salt, three drams of saltpeter, one pint of powered charcoal, and one pint of a decoction of oak-bark, prepared by boiling one pound of oak-bark in half a gallon of water until reduced to one pint. After stirring all these ingredients together, so that they shall be properly combined and commingled, the eggs are placed therein; or the eggs are first carefully packed in a vessel and the solution poured over them until the eggs are covered. The vessel is then tightly covered, to prevent the evaporation of the solution.

The lime, charcoal, salt, and saltpeter, in addition to filling the pores of the shell and preventing entrance of air thereto, also act to preserve the solution from decomposition or deterioration, while the decoction of oak-bark acts as an astringent upon the egg-shell and counteracts any tendency that the lime or other ingredients may have to decompose or injure the egg-shell.

Eggs will therefore, when submerged in a solution prepared as herein set forth, be preserved for a long time in a perfectly sweet and sound condition.

I am aware that a compound in which each of the ingredients employed by me, except the tannin extract, has before been employed in a solution for preserving eggs. I therefore make no claim to the use of these separate ingredients.

Having thus fully described my invention, what I claim as new, and desire to secure by Letters Patent of the United States, is—

The herein-described compound for preserving eggs, consisting of water, lime, salt, saltpeter, decoction of oak-bark, and charcoal, in about the proportions stated.

LEVI ISAAC BODENHAMER.

In presence of—
W. D. DEEN,
J. M. BODENHAMER.